United States Patent [19]
Cole

[11] 4,286,463
[45] Sep. 1, 1981

[54] AIR SOCK

[76] Inventor: H. Ray Cole, R.R. 1, Rosendale, Mo. 64483

[21] Appl. No.: 95,511

[22] Filed: Nov. 16, 1979

[51] Int. Cl.³ .............................................. G01W 1/02
[52] U.S. Cl. ..................................................... 73/189
[58] Field of Search ............... 73/189, 170 R, 861.71, 73/861.74, 861.75, 861.79; 116/284

[56] References Cited

U.S. PATENT DOCUMENTS

| | | | |
|---|---|---|---|
| 3,074,372 | 1/1963 | Furey | 73/519 X |
| 3,696,672 | 10/1972 | Lindsay | 73/189 |
| 4,155,252 | 5/1979 | Morrill | 73/189 |

Primary Examiner—Jerry W. Myracle
Attorney, Agent, or Firm—Lowe, Kokjer, Kircher, Wharton & Bowman

[57] ABSTRACT

An air sock for indicating wind speed as well as direction is the subject of the present invention. A fabric type sock member is mounted on an upright standard for pivotal movement about its longitudinal axis. A spring is provided for existing pivotal movement and an arrangement is also provided for effecting pivotal movement in response to wind speed. The air sock is divided into equal quadrants of different colors so that, as the wind speed increases, a different color will be visible from an aircraft overhead. In one form of the invention, a torsion spring is utilized to resist the pivotal movement and an impeller is provided for effecting the pivotal movement. In an alternative form of the invention, a single tension spring is utilized to resist the pivotal movement and also effect the movement in response to increases in wind speed.

16 Claims, 7 Drawing Figures

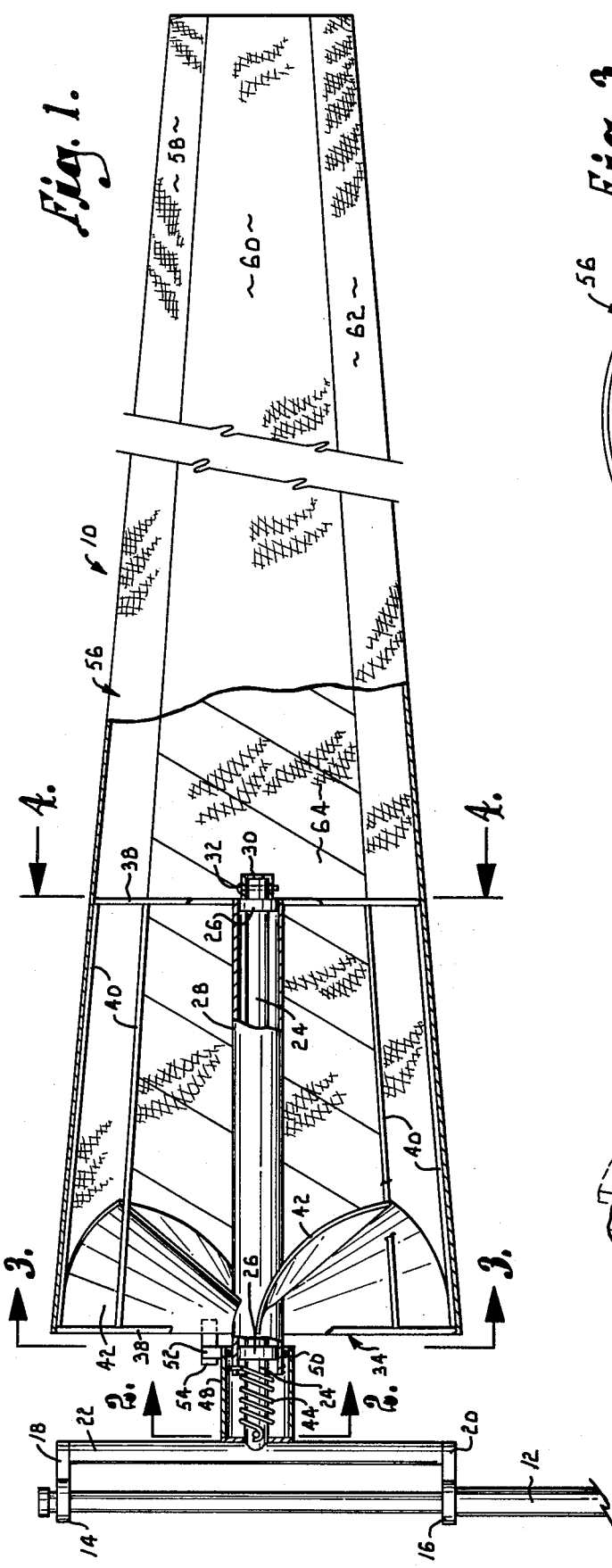
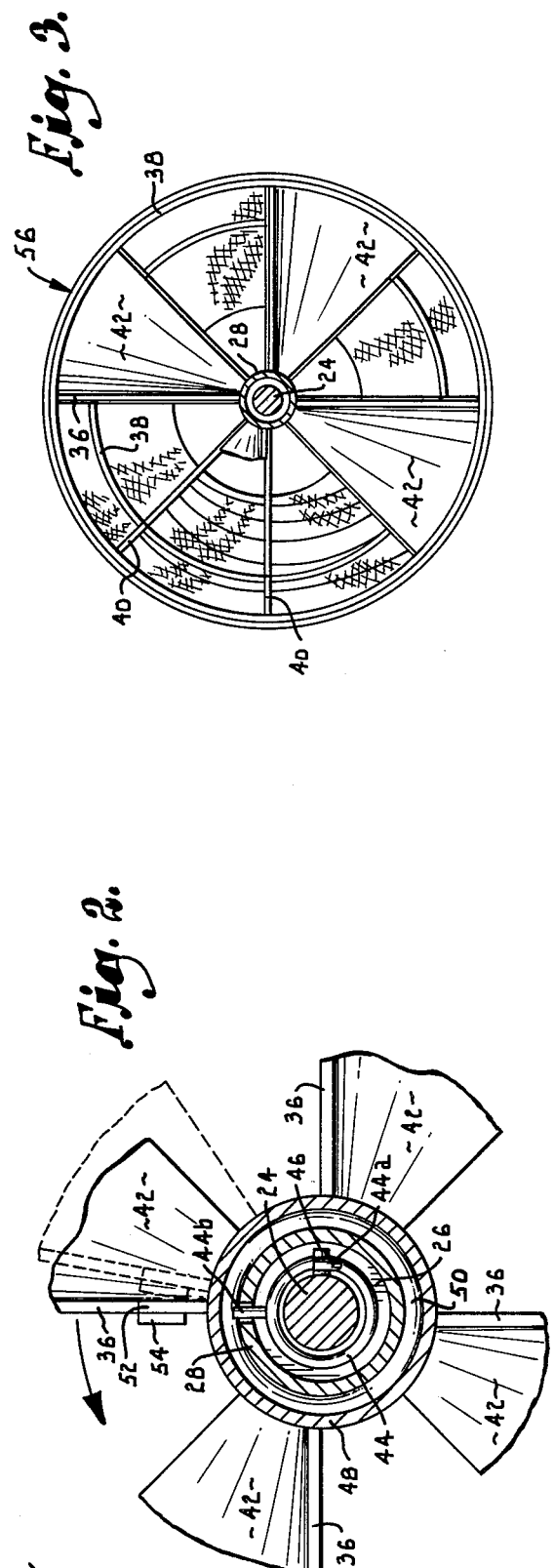

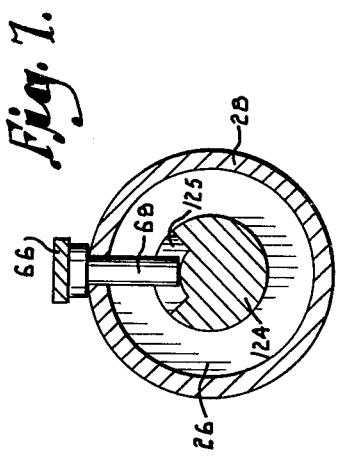
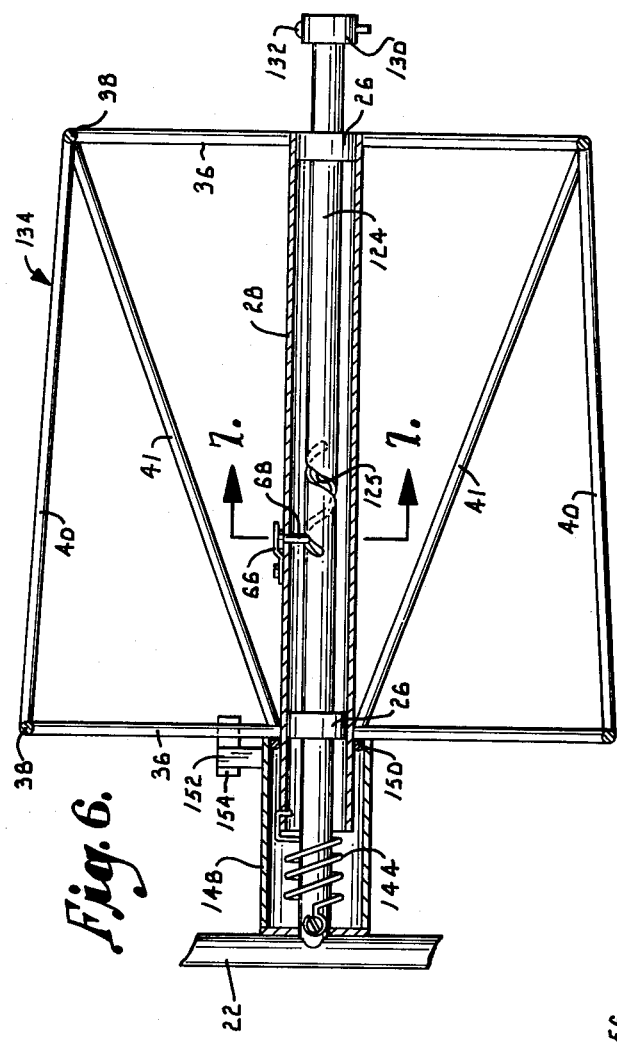
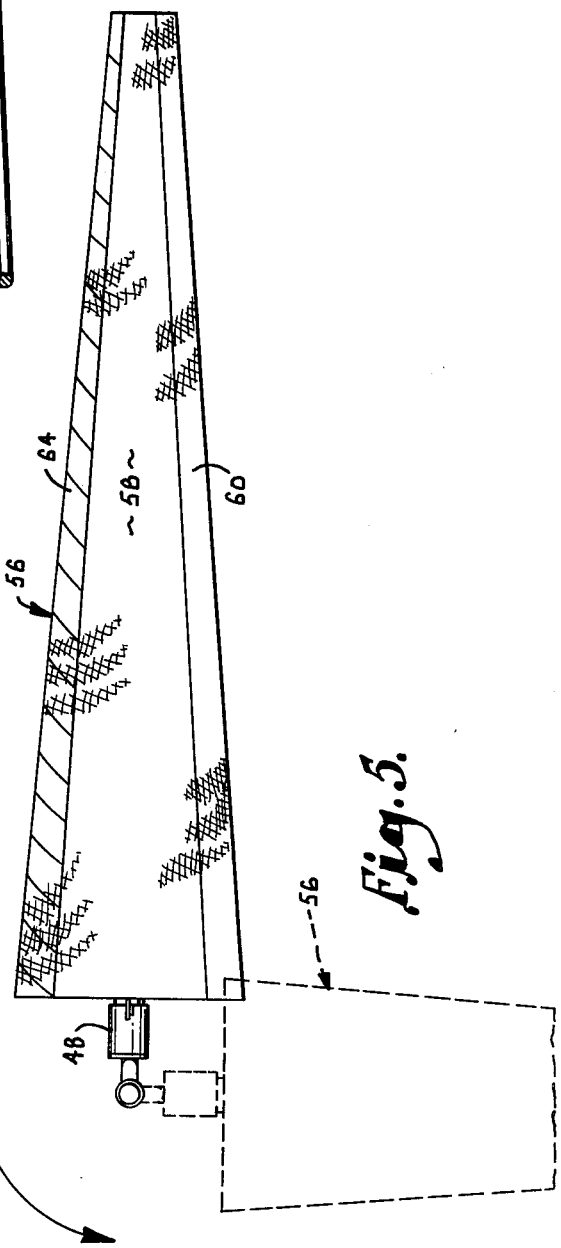
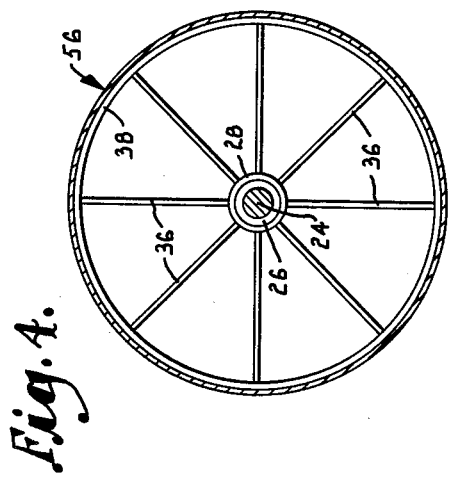

AIR SOCK

This invention relates generally to instrumentation for determining wind speed and direction and, more particularly, to an air sock for use in conjunction with air fields.

Air socks have long been used in conjunction with airfields to provide aircraft pilots with an indication of wind direction. While a conventional air sock will also provide some indication of wind velocity, its accuracy in this regard is limited largely to determining whether the wind is blowing "hard" or not at all.

An improvement in the basic air sock design is disclosed in U.S. Pat. No. 3,696,672, issued to John Lindsay, Oct. 10, 1972. The device shown in the referenced patent is a freely rotatable sock which, in rotating about its axis, provides an indication of wind speed. While the device disclosed in the referenced patent does represent an improvement over earlier devices, it still does not provide the degree of certainty in indicating wind speed which is necessary for safe and reliable aircraft operation.

Particularly in the case of small airfields where radio contact with the ground is not always possible, it is extremely important for a pilot to have the best possible information with regard to ground wind speed. Especially when a cross wind is blowing, it is unsafe for a small aircraft to land if the cross wind is blowing at too high a speed.

It is, therefore, the primary object of the present invention to provide an air sock which indicates wind direction and also provides a visual indicator of wind speed in incremental units.

Another primary objective of the invention is to provide an air sock of the type indicated in the foregoing object which provides an indication of wind speed in incremental units wherein the indicator is accurate to within a few miles-per-hour up to the design maximum.

It is an important aim of the invention to provide an air sock as indicated in the foregoing objects which mounts on the existing approved staff support of the Federal Aviation Administration.

Another objective of the present invention is to provide an air sock which visually indicates both wind direction and speed in incremental units and which does not require any external power source.

Still another object of the invention is to provide an air sock of the type described in the foregoing objects which is economical to build and easily installed using existing technology.

Other objects of the invention will be made clear or become apparent from the following description and claims when read in light of the accompanying drawing wherein:

FIG. 1 is a side elevational view of the air sock of the present invention with portions broken away and shown in cross section for purposes of illustration;

FIG. 2 is an enlarged vertical cross section taken along line 2—2 of FIG. 1;

FIG. 3 is a vertical cross-sectional view looking in the direction of arrows 3—3 of FIG. 1;

FIG. 4 is a third vertical cross-sectional view taken along lines 4—4 of FIG. 1;

FIG. 5 is a top plan view of the air sock illustrating the manner in which it pivots in response to a change in wind direction;

FIG. 6 is a side elevational view of an alternative form of the invention with portions shown in cross-section; and FIG. 7 is an enlarged vertical cross-sectional view taken along lines 7—7 of FIG. 6.

Referring initially to FIG. 1, the air sock of the present invention is designated generally by the numeral 10. The air sock 10 is mounted on an upright staff support 12 of a conventional nature. Staff support 12 is provided with upper and lower sealed bearings 14 and 16 which are free to rotate about the staff. The bearings are rigid with upper and lower bracket mounts 18 and 20 which in turn hold a vertical bracket support 22.

The air sock 10 of the present invention is mounted on support 22 and comprises a rigid horizontally extending member 24 which is rigid with support 22.

First and second bearing housings 26 are carried by member 24 and serve to mount sleeve 28 which is keyed to the bearings. A cap 30 covers the exposed end of member 24 and receives a pin 32 which passes through the cap and the member to lock the sleeve and bearing assembly in place.

Sleeve 28 serves to rotatably mount a framework and impeller assembly which will now be described. The framework is designated generally by the numeral 34 and is disposed in the shape of a truncated cone. A plurality of spoke members 36 extend radially outward from the sleeve 28 at each end of the latter and are located in circumferentially spaced relationship. Each set of spokes 36 is circumferentially enclosed by a rim 38. A plurality of longitudinally extending parallel cross braces 40 span the distance between the two rims 38 and are rigid with the latter to complete the framework.

The spokes 36 at the large end of framework 34 also serve to mount curvilinear impeller vanes 42 best illustrated in FIG. 1. Further suport for vanes 42 may be provided by welding the base of each vane to sleeve 28.

As best understood from referring to FIGS. 1 and 2, rigid horizontal support member 24 also serves to mount a coil spring 44. A locking pin 46 extends laterally from member 24 and is rigid therewith to hold one end 44a of the spring. The other end 44b of the spring is received in an opening provided in sleeve 28.

A housing 48 is secured to bracket support 22 and extends away from the latter to enclose spring 44. An O-ring 50 is sandwiched between sleeve 28 and housing 48 to seal the interior of the housing from moisture and dirt. A rigid tab stop 52 is rigid with housing 48 and is designed and positioned to be engaged by a movable stop member 54 carried by one of the spokes 36.

A generally flexible fabric sock is designated by the numeral 56 and extends over framework 34 and beyond to complete air sock 10. Sock 56 is divided into four equal quadrants designated in FIG. 1 by the numerals 58 through 64. Each of the quadrants 58 through 64 is identical, except for color, and comprises a generally wedge shaped segment of the conically shaped sock 56. Any readily distinguishable color scheme may be used, for example, red in one quadrant, white in another, blue in another, and black and white striping (as indicated for the segment 64) in another. It is also to be understood that while sock 56 is illustrated as being divided into four equal quadrants, a smaller or greater number of sections could be utilized.

In operation, air sock 10 is mounted in an unobstructed location where it is free to respond to changes in wind speed and direction. Air enters the large end of framework 34 and strikes vanes 42 thereby causing pivotal movement of the vanes and the sleeve 28. This pivotal movement is resisted by coil spring 44 which is designed to exert a uniform resistance force as it is coiled more and more tightly around support member 24. For example, coil spring may be designed so that for 5 winds of from 0 to approximately 7 m.p.h., the strength of the spring will be sufficient to resist any pivotal movement of sleeve 28. Thus, the quadrant 58 will remain at the top of the air sock and will be visible from an aircraft to indicate a wind speed of 7 m.p.h. or less.

As the wind speed increases from say 7 m.p.h. to 14 m.p.h., impellers 42 will impart a torsional force sufficient to rotate sleeve 28 approximately 90° in a counter-clockwise direction so as to bring quadrant 60 of sock 56 to the location previously occupied by quadrant 58. Since quadrant 60 is of a different color, it will provide a readily apparent visual indication to a pilot that the wind speed is between 7 and 14 m.p.h. As the velocity of the wind continues to increase, for example from 14 to 21 m.p.h., coil spring 44 will be wound still tighter on support member 24 thereby causing quadrant 62 to move to the top location. Finally, when the wind speed advances beyond 21 m.p.h., the fourth quadrant 64 will move to the top location to provide a further visual indictor of the wind speed. As the wind speed reaches and excedes the design maximum of the unit 34, stop member 54 will engage stop tab 52 to prevent further pivotal movement. Thus, the unit will be held in position indicating maximum wind velocity until the speed of the wind is reduced.

As wind speed decreases, the torsional forces inherent in spring member 44 will cause the spring to unwind relative to support member 24, turning sleeve 28 and the associated framework and sock 56 in the opposite direction. Thus, the device will continue to provide an accurate indication of wind speed whether the speed is changing in a positive or negative direction.

As indicated in FIG. 5, the air sock 10 also provides an accurate indication of wind direction by virtue of the pivotal mounting on staff support 12. As the direction of the wind changes, the circumferential location of air sock 10 will change so as to always face the large end of framework 34 toward the direction from which the wind is blowing.

Referring now to FIGS. 6 and 7, an alternative form of the invention is shown. The alternative form of the invention utilizes the same upright staff as with the preferred embodiment and a bracket support 22 is mounted for 360° rotation as previously described. A horizontal rigid support member 124 extends at a right angle from support 22 and mounts bearing housings 26 which are disposed in spaced apart relationship. Support member 124 is provided with a circumferentially extending curvilinear groove track 125 for purposes to be described hereinafter. Rigid with bearing housings 26 so as to rotate therewith is elongated sleeve 28.

Mounted on sleeve 28 is a framework 134 similar to the framework 34 previously described. Framework 134 is provided with a plurality of radially extending spokes 36 which are circumferentially spaced around sleeve 28 and rigid with the latter. Each of the spokes 36 is in turn rigid with a circumferential rim 38 which encloses the spokes. Cross braces 40 extend between the two rims 38 and angle braces 41 extend from the base of one set of spokes to the opposite rim 38.

A coiled tension spring member 144 has one end secured to member 24 and the other end secured to sleeve 28 as previously described for the spring 44. A housing 148 encases spring 144 and is sealed by an O-ring 150.

A stop tab 152 is rigid with housing 148 and a stop member 154 is rigid with one of spokes 36. The stop tab and the stop member are disposed in perpendicular relationship for interengagement as previously described for tab 52 and stop member 54. A bracket 66 is secured to sleeve 28 and mounts a follower pin 68 which extends through the side wall of sleeve 28. Follower pin 68 is received by groove track 125.

As will be described more fully hereinafter, the alternative form of the invention is designed so that framework 134 moves longitudinally relative to support member 124, to a limited degree, and to this end support 124 is slightly longer than the corresponding support 24. Accordingly, an end cap 130 is provided at the end of support member 124 and a locking pin 132 extends through the end cap and the support member 124 so as to limit the extent of movement of framework 134.

Spring 144 is of a type such that while it resists pivotal movement or unwinding at any one longitudinal position, as a force is applied sufficient to overcome the resistance of the spring and elongate it, the spring will also exert a torsional force partially unwinding until an equilibrium condition is reached. Stated differently, spring 144 is of a design such that for any given threshold force it will resist both elongation and pivotal movement. When the force on the spring exceeds the threshold force, however, the spring will both elongate and unwind thereby exerting a moment force. The unwinding continues until the resistance of the spring is in equilibrium with the force tending to unwind it.

Thus, in operation, the alternative form of the invention functions similar to the preferred form above described. It is to be understood that the flexible sock 56 is not shown in FIG. 6 but would be fastened to frame 134 in the same manner as previously described for the framework 34. When the wind blows through the sock from the large end of the framework, the spring 144 will hold one quadrant of the sock in the upper position until the wind velocity reaches a level where the spring tends to unwind and elongate. When this occurs, sleeve 28 will rotate and track 125 along with pin 68 will guide pivotal movement of the sleeve relative to support member 124.

As with the preferred embodiment described above, continued rotation of sleeve 28 will expose a different quadrant of the sock 56 to indicate a different wind speed. Rotation of the entire assembly more than one revolution is precluded by interengagement of tab 152 with stop 154 as well as by pin 68 reaching the end of track 125.

It is also possible to apply the principles of the alternative embodiment above described to an air sock which eliminates the supporting framework. That is, support 124 and the framework 134 could be eliminated and an air sock secured directly to a spring of the same type as the spring 144 above described. The sock would be pivoted by the spring in response to increases in wind velocity, the same as sleeve 28 for the alternative embodiment described above.

I claim:

1. An instrument for indicating the speed of the wind, said instrument comprising:
   a generally conically shaped member open at at least one end, said member being divided into longitudinally extending sections around its perimeter with each section being characterized by a visible marking distinguishing it from the other sections;

means for mounting said member for pivotal movement about its longitudinal axis;

means for acting on said member for resisting said pivotal movement about said longitudinal axis;

means for mounting said member for pivotal movement about a vertical axis in response to changes in wind direction; and means for effecting said pivotal movement of said member about said longitudinal axis responsive to wind speed whereby one of said sections will be visible from an overhead position to provide an indication of wind speed.

2. An instrument as set forth in claim 1, wherein is included means for limiting the extent of pivotal movement of said member to approximately one revolution.

3. An instrument as set forth in claim 1, wherein said member comprises a framework and a fabric covering over said framework.

4. An instrument as set forth in claim 3, wherein said member comprises a truncated cone open at both ends.

5. An instrument as set forth in claim 1, wherein said means for resisting pivotal movement about said longitudinal axis and said means for effecting pivotal movement about said longitudinal axis comprise a unitary longitudinally extending coil spring means characterized by an ability to resist unwinding at any one longitudinal position and an ability to unwind in response to a force of elongation.

6. An instrument as set forth in claim 1, wherein said means for resisting pivotal movement about said longitudinal axis comprises coil spring means and said means for effecting pivotal movement about said longitudinal axis comprises vane means coupled with said member.

7. An instrument as set forth in claim 6, wherein said member comprises a framework and a fabric covering over said framework, said vane means being mounted on said framework at said one end.

8. An instrument as set forth in claim 1, wherein said member is divided into at least four of said sections of equal size, each of said sections extending substantially the entire length of said member.

9. An instrument for indicating the velocity of the wind, said instrument comprising:

a generally conically shaped member open at at least one end;

said member being divided into longitudinally extending sections around its perimeter with each section being characterized by a visible marking distinguishing it from the other sections;

means for mounting said member for pivotal movement about a vertical axis in response to changes in wind direction;

means for mounting said member for pivotal movement about its longitudinal axis;

longitudinally extending coil spring means coupled with said member, said spring means being characterized by an ability to resist unwinding at any one longitudinal position and an ability to unwind in response to a force of elongation whereby said member is held in one circumferential position at a given wind speed and is rotated to a different position in response to a change in wind speed.

10. An instrument as set forth in claim 9, wherein is included means for limiting the extent of pivotal movement about said longitudinal axis of said member to approximately one revolution.

11. An instrument as set forth in claim 9, wherein said means for mounting said member for pivotal movement about said longitudinal axis comprises a shaft extending longitudinally of the member.

12. An instrument as set forth in claim 9, wherein said member comprises a framework and a fabric covering over said framework and said longitudinal pivotal mounting means comprises a stationary shaft extending longitudinally of the member, said spring means being wound around said shaft and including guide means coupled with said spring means and said shaft for guiding the spring means as it rotates relative to the shaft.

13. An instrument for indicating the velocity of the wind, said instrument comprising:

a generally conically shaped member open at at least one end;

said member being divided into longitudinally extending sections around its perimeter with each section being characterized by a visible marking distinguishing it from the other sections;

means for mounting said member for pivotal movement about a vertical axis in response to changes in wind direction;

means for mounting said member for pivotal movement about its longitudinal axis;

vane means coupled with said member for effecting pivotal movement of said member responsive to wind speed; and spring means coupled with said member for resisting said pivotal movement about said longitudinal axis.

14. An instrument as set forth in claim 13, wherein is included means for limiting the extent of pivotal movement of said member about its longitudinal axis to approximately one revolution.

15. An instrument as set forth in claim 13, wherein said means for mounting said member for pivotal movement about its longitudinal axis comprises a shaft extending longitudinally of the member.

16. An instrument as set forth in claim 13, wherein said member comprises a framework and a fabric covering over said framework, said vanes being coupled with said framework at said longitudinal one end, and said pivotal mounting means including a longitudinal extending shaft coupled with said framework.

* * * * *

UNITED STATES PATENT AND TRADEMARK OFFICE
CERTIFICATE OF CORRECTION

PATENT NO. : 4,286,463
DATED : September 1, 1981
INVENTOR(S) : H. Ray Cole

It is certified that error appears in the above-identified patent and that said Letters Patent are hereby corrected as shown below:

Claim 16 should read as follows:

16. An instrument as set forth in claim 13, wherein said member comprises a framework and a fabric covering over said framework, said vanes being coupled with said framework at said one end, and said longitudinal pivotal mounting means including a longitudinal extending shaft coupled with said framework.

Signed and Sealed this

Tenth Day of November 1981

[SEAL]

*Attest:*

*Attesting Officer*

GERALD J. MOSSINGHOFF

*Commissioner of Patents and Trademarks*